US010346563B2

(12) United States Patent
Reese

(10) Patent No.: US 10,346,563 B2
(45) Date of Patent: Jul. 9, 2019

(54) ELECTRIC UTILITY MODEL INFORMATION INTERFACE SYSTEM

(71) Applicant: Fluor Technologies Corporation, Sugar Land, TX (US)

(72) Inventor: David McNeill Reese, Greer, SC (US)

(73) Assignee: Fluor Technologies Corporation, Sugar Land, TX (US)

(*) Notice: Subject to any disclaimer, the term of this patent is extended or adjusted under 35 U.S.C. 154(b) by 533 days.

(21) Appl. No.: 14/995,921

(22) Filed: Jan. 14, 2016

(65) Prior Publication Data

US 2017/0206284 A1    Jul. 20, 2017

(51) Int. Cl.
    *G06F 7/48*      (2006.01)
    *G06F 17/50*     (2006.01)
    *G06Q 50/06*     (2012.01)

(52) U.S. Cl.
    CPC ........ *G06F 17/5009* (2013.01); *G06F 17/509* (2013.01); *G06Q 50/06* (2013.01); *G06F 2217/78* (2013.01); *Y02E 60/76* (2013.01); *Y04S 40/22* (2013.01)

(58) Field of Classification Search
    CPC .................................. G06F 17/5002
    USPC ...................................... 703/13, 3
    See application file for complete search history.

(56) References Cited

U.S. PATENT DOCUMENTS

| | | | | |
|---|---|---|---|---|
| 7,598,751 B2* | 10/2009 | Collins, Jr. | ........ | G01R 19/2513 324/649 |
| 8,032,846 B1* | 10/2011 | Balasubramanian | ........ | G06F 17/5045 716/100 |
| 2004/0032504 A1* | 2/2004 | Shan | ........ | G01D 4/006 348/207.99 |
| 2011/0246109 A1* | 10/2011 | Fafard | ........ | H02S 50/10 702/64 |
| 2012/0197552 A1* | 8/2012 | Robinson | ........ | G01D 4/002 702/50 |

FOREIGN PATENT DOCUMENTS

CN    202904674 U    *    4/2013

OTHER PUBLICATIONS

Ricardo Lent, Simulating the Power Consumption of Computer Networks. (Year: 2010).*

(Continued)

*Primary Examiner* — Lechi Truong
(74) *Attorney, Agent, or Firm* — Conley Rose, PC

(57) ABSTRACT

A method comprises: transmitting, to a server, a request for performance metrics of a utility system; receiving, from the server, the performance metrics; creating a design for a power distribution system based on the performance metrics; obtaining components for the power distribution system based on the design; and installing the components to implement the design. A system comprises: a database server configured to: receive documents associated with components of a utility system, extract equipment rating information from the documents, and store the equipment rating information in a usable form in a database; and a model computer coupled to the database server and configured to: receive the equipment rating information from the database server, create a utility system model based on the equipment rating information, and determine short-circuit parameters for nodes associated with customers.

24 Claims, 6 Drawing Sheets

(56) References Cited

OTHER PUBLICATIONS

NFPA 70E, Standard for Electrical Safety in the Workplace, 2015 Edition, NFPA, Quincy, MA.

* cited by examiner

ELECTRIC UTILITY MODEL INFORMATION INTERFACE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric utilities typically generate software models of their utility systems. When the utilities modify their utility systems, they then regenerate their models. The utilities also provide various performance metrics to their customers based on those models. Using the performance metrics, the customers design and install their power distribution systems. There is a need to improve both the process used to generate the software models and the provision of the performance metrics to the customers.

SUMMARY

In one embodiment, the disclosure includes a method comprising: transmitting, to a server, a request for performance metrics of a utility system; receiving, from the server, the performance metrics; creating a design for a power distribution system based on the performance metrics; obtaining components for the power distribution system based on the design; and installing the components to implement the design.

In another embodiment, the disclosure includes a method comprising: creating a utility system model of a utility system; installing a new component in the utility system; obtaining a document associated with the new component; transmitting, to a database server, the document; extracting, by the database server, equipment rating information from the document; and transmitting, to a model computer, the equipment rating information.

In yet another embodiment, the disclosure includes a system comprising: a database server configured to: receive documents associated with components of a utility system, extract equipment rating information from the documents, and store the equipment rating information in a usable form in a database; and a model computer coupled to the database server and configured to: receive the equipment rating information from the database server, create a utility system model based on the equipment rating information, and determine short-circuit parameters for nodes associated with customers.

In yet another embodiment, the disclosure includes a method comprising: providing a utility system model indicative of a utility system with customers connected to the utility system in order to draw electricity from the utility system; providing a network server accessible by the customers and in communication with the utility system model; updating performance metrics of the utility system model at all nodes of the utility system using the utility system model to create updated performance metrics; and storing the updated performance metrics in a database server.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
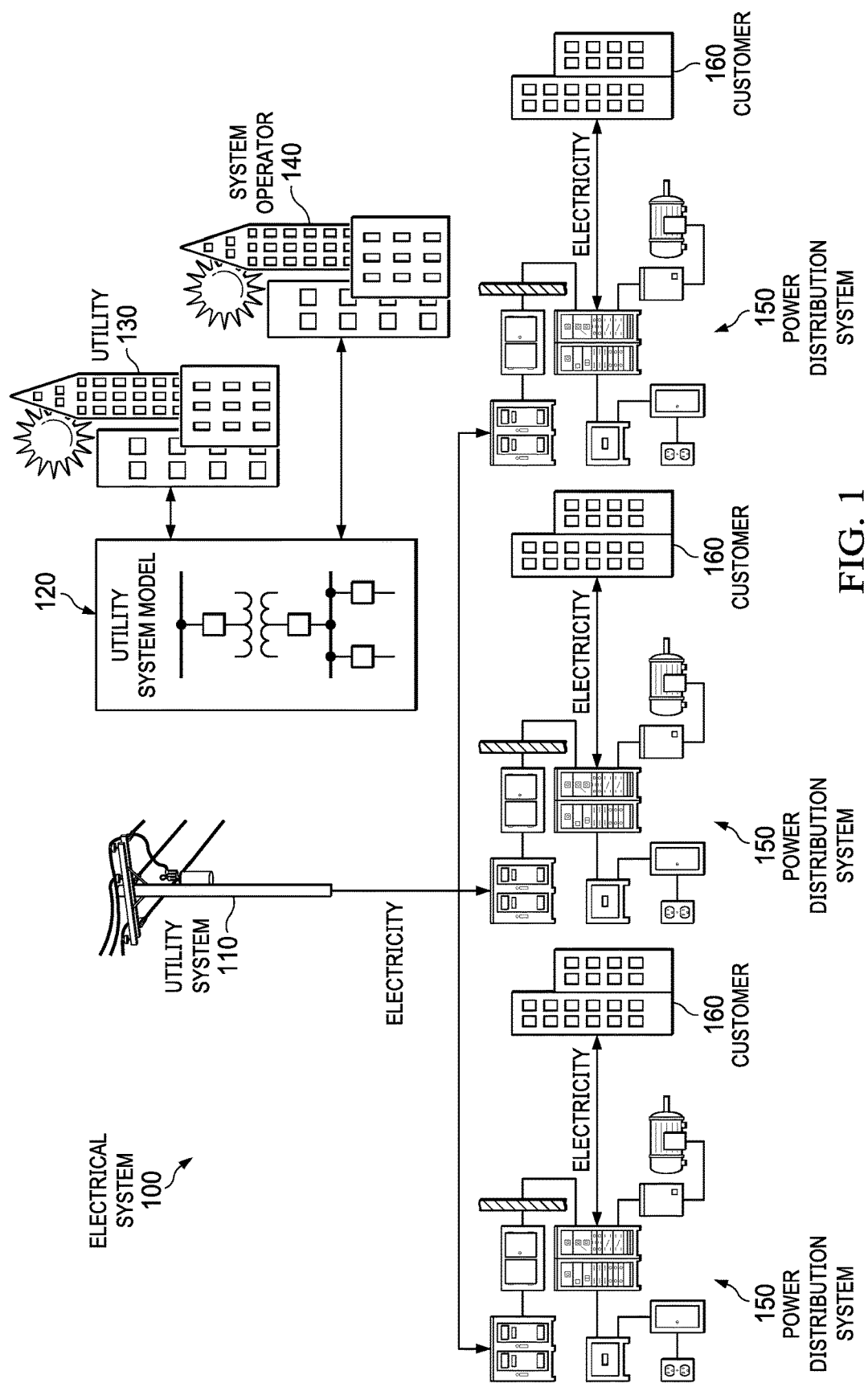
FIG. 1 is a schematic diagram of an electrical system.

FIG. 1 is a schematic diagram of an electrical system 100. The electrical system 100 comprises a utility system 110, a utility system model 120, a utility 130, a system operator 140, power distribution systems 150, and customers 160. The electrical system 100 is shown in a simplified manner, so other components may be present in the electrical system 1100.

The utility system 110 comprises physical components that generate, transmit, and distribute electricity for the customers 160. Those physical components include generating stations, transmission lines, and transformers. The utility system model 120 is a computerized model of the utility system 110 and provides various performance metrics associated with the utility system 110.

The utility 130 is a company or other entity that provides for the generation, transmission, and distribution of electricity to the customers 160 using the utility system 110. The system operator 140 maintains the components of the utility system 110. In some cases, the utility 130 and the system operator 140 are the same company. The utility 130 or the system operator 140 possesses the utility system model 120.

The customers 160 are entities that purchase electricity from the utility 130 and receive electricity from the utility 130 through the utility system 110. The customers 160 may be single-family homes, apartment complexes, or commercial facilities and may number from a few to hundreds of thousands. Each customer 160 has a power distribution system 150 that receives electricity from the utility system 110 and distributes the electricity throughout the facility belonging to the customer 160. For commercial facilities and particularly for large industrial facilities that have more complex power distribution systems 150, it is necessary to properly design the power distribution system 150 before installing it.

In order to properly design the power distribution system 150, the customer 160 performs a short-circuit analysis. The short-circuit analysis determines short-circuit currents and other properties at points in the power distribution system 150. Short-circuit currents are currents that introduce large amounts of destructive energy in the forms of heat and magnetic force into the power distribution system 150. That energy may damage components or injure people. Generally, performing the short-circuit analysis allows the customer 160 to determine what components are needed to withstand that energy at the various points in the power distribution system 150. Specifically, performing the short-circuit analysis allows the customer 160 to determine proper component size, interrupting ratings of components such as circuit breakers and fuses, switchgear ratings, relay settings, personal protective equipment (PPE) that workers need to wear around the points in the power distribution system 150, and arc flash values.

An arc flash is the energy that results from short-circuit currents. The customer 160 needs to know arc flash values in order to create or obtain, and then apply, arc flash hazard (AFH) labels with the arc flash values and with PPE requirements. AFH labels may have adhesive backings so that the customer 160 can physically apply the AFH labels to components in the power distribution system 150. National Fire Protection Association (NFPA) 70E, which is incorporated by reference, is a standard that requires that the customer 160 apply the AFH labels upon installing the power distribution system 150 and that the customer 160 update the AFH labels every five years thereafter at a minimum or when major changes occur in the power distribution system 150.

To perform the short-circuit analysis, the customer 160 needs to obtain various short-circuit parameters, including a short-circuit contribution, reactance-to-resistance ratio (X(R ratio), tripping time, minimum short-circuit current, maximum short-circuit current, minimum system voltage, maximum system voltage, and fault clearing time at each node associated with each power distribution system 150. The customer 160 requests those short-circuit parameters from the utility 130 or the system operator 140. The utility 130 or the system operator 140 determines the short-circuit parameters based on calculations using the utility system model 120. However, it may take a while for the utility 130 or the system operator 140 to determine the short-circuit parameters and respond to the request because the utility 130 or the system operator 140 may accommodate many such requests from the customers 160. Thus, the customer 160 may not receive a response to the request at all, or the customer 160 may need to make many such requests in order to receive a response. This may significantly delay design and installation of the power distribution system 150. In addition, when the utility 130 or the system operator 140 does provide the short-circuit parameters, the short-circuit parameters apply to the present design of the utility system 110, but do not consider expansion or other modifications of the utility system 110. Thus, the customer 160 may install improperly-sized components in the power distribution system 150 or may apply inaccurate AFH labels.

In order to address those issues, the customers 160 may perform an overly conservative short-circuit analysis. For instance, the customers 160 may assume an infinite bus. However, this approach may cause the customers 160 to install or add oversized components or to apply ART labels with higher values. Oversized components cost more. In order to satisfy AFH labels with higher values, the customers 160 purchase higher-rated PPE that also costs more.

In addition to those issues, the utility 130 or the system operator 140 must obtain equipment rating information from each component in the utility system 110 in order to generate the utility system model 120 and the short-circuit parameters. This requires that workers visit the various components of the utility system 110, record equipment rating information, and manually enter the equipment rating information into a system that represents the utility system model 120. Alternatively, the workers obtain from the component manufacturers the equipment rating information for all of the components in a tabular format. However, in both approaches, the manual entry of the equipment rating information is time consuming and prone to human error. Human error may result in an inaccurate utility system model 120, which may result in inaccurate short-circuit parameters, inaccurate design of the power distribution system 150, improperly-sized components in the power distribution system 150, and conditions that are unsafe for workers near those components.

Disclosed herein are embodiments for an improved electric utility modeling and information system. Specifically, a server provides a centralized system that provides up-to-date short-circuit parameters or other information based on the most recent utility system and utility system model. The utility or system operator proactively updates the short-circuit parameters based on triggers. The customers may then access the short-circuit parameters at any time or at specific times. The server may be implemented in any applications where customers need utility system information for engineering analysis. Such applications include Engineering, Procurement and Construction (EPC) design work, preventative maintenance planning, Operations and Maintenance (O&M) outage planning, and plant modifications. In addition, an imaging device captures images of identification plates on components in the utility system and transmits the images to a server. The server performs optical character recognition (OCR) on the images to extract equipment rating information and transmits the equipment rating information to a model computer. The model computer generates or updates a utility system model based on the equipment rating information. This process saves time by reducing the need for workers to manually gather and enter equipment rating information, reduces the likelihood of human error in the gathering and entering processes, summarizes the equipment rating information into a usable format, and ensures that the utility system model is based on accurate and current equipment rating information.

Figure 2:
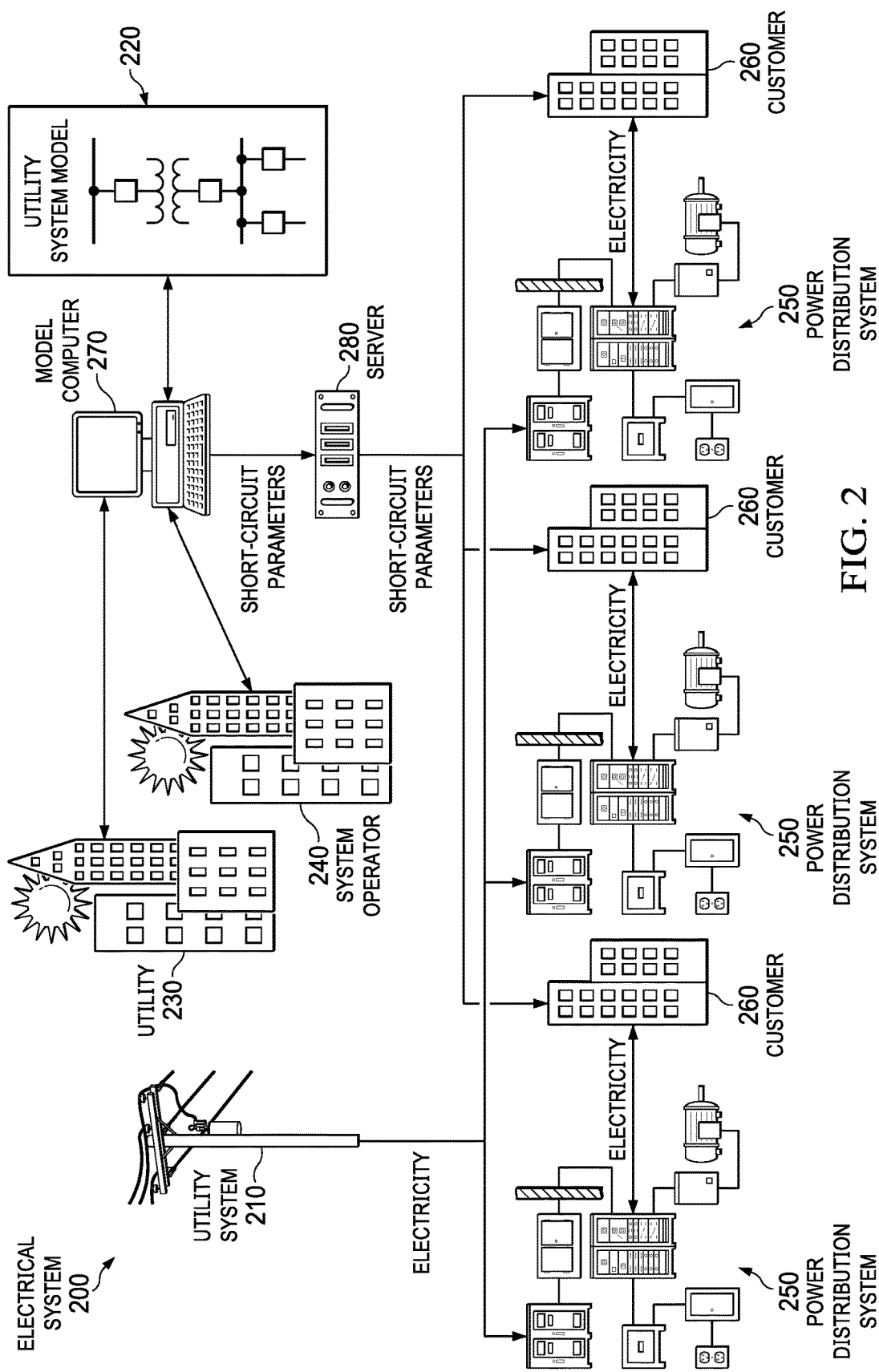
FIG. 2 is a schematic diagram of an electrical system according to an embodiment of the disclosure.

FIG. 2 is a schematic diagram of an electrical system 200 according to an embodiment of the disclosure. The electrical system 200 in FIG. 2 is similar to the electrical system 100 in FIG. 1. Specifically, the electrical system 200 in FIG. 2 comprises a utility system 210, a utility system model 220, a utility 230, a system operator 240, power distribution systems 250, and customers 260 similar to the utility system 110, the utility system model 120, the utility 130, the system operator 140, the power distribution systems 150, and the customers 160, respectively, in FIG. 1. Unlike the electrical system 100 in FIG. 1, the electrical system 200 in FIG. 2 also comprises a model computer 270 and a server 280.

The utility 230 or the system operator 240 possesses the model computer 270. The model computer 270 is any suitable computer or network of computers. The model computer 270 designs and maintains the utility system model 220 with modeling software such as ASPEN, ETAP, SKM Systems Analysis, EasyPower, or other suitable software. Using the utility system model 220, the model computer 270 determines the short-circuit parameters, including the short-circuit contribution, X/R ratio, tripping time, minimum short-circuit current, maximum short-circuit current, minimum system voltage, maximum system voltage, and fault clearing time at the node associated with each power distribution system 250. The model computer 270 transmits those short-circuit parameters to the server 280. Alternatively, the model computer 270 transmits to the server 280 a subset of those short-circuit parameters or additional information not listed above.

The server 280 is any suitable computer server. The server 280 resides in a local area network (LAN) associated with the utility 230 or the system operator 240 and communicates with the customers 260 via an extended network such as the Internet. Alternatively, the server 280 resides in an extended network. There server 280 may therefore be referred to as a network server. The server 280 receives the short-circuit parameters from the model computer 270 and transmits those short-circuit parameters to the customers 260. Though short-circuit parameters are discussed, the same process applies to any performance metrics or safety parameters.

Various triggers cause the utility 230 or the system operator 240 to update the utility system model 220 via the model computer 270. Those triggers include modifications to the utility system 210, schedules, and requests from the customers 260 to provide the short-circuit parameters. For the first trigger, workers modify the physical components of the utility system 210 and provide information indicating the modification to the utility 230 or the system operator 240. Alternatively, sensors exist throughout the utility system 210, detect the modification, and transmit data indicating the modification directly to the model computer 270. For the second trigger, the utility 230 or the system operator 240 accumulates information indicating modifications and updates the utility system model 220 every day, week, month, year, or other suitable period. For the third trigger, the utility 230 or the system operator 240 accumulates information indicating modifications and updates to the utility system model 220 after receiving a request from a customer 260 to provide the short-circuit parameters. The utility 230 or the system operator 240 may do so after a single request or any suitable number of requests.

After a trigger, the utility 230 or the system operator 240 inputs that modification into the model computer 270. The model computer 270 updates the utility system model 220 and the short-circuit parameters accordingly. The model computer 270 transmits the updated short-circuit parameters to the server 280. Finally, the server 280 transmits the updated short-circuit parameters to the customers 260.

The server 280 provides access to the customers 260 at all times or at specific times. The customers 260 access the server 280 when they desire to design and install their power distribution systems 250, when they desire to modify their power distribution systems 250, every five years after installing their power distribution systems 250 as required by NFPA 70E, at other times required by other standards, or at any other suitable times. The server 280 may provide an Internet webpage that the customers 260 may access via browsers on computers or via an application on a computer, mobile phone, or other device. The webpage or application may require credentials such as an account number or username, as well as a password.

Upon receiving the short-circuit parameters from the server 280, the customers 260 design and install their power distribution systems 250 or modify their power distribution systems 250 based on the short-circuit parameters. When they do so, the customers 260 apply AFH labels to the components in the power distribution system 250 also based on the short-circuit parameters, as well as an arc flash analysis. When workers associated with the customers 260 work near the components, the workers wear PPE based on what the AFH labels require. The customers may also determine other performance metrics or safety parameters and apply labels with that information to the components in the power distribution system 250.

Figure 3:
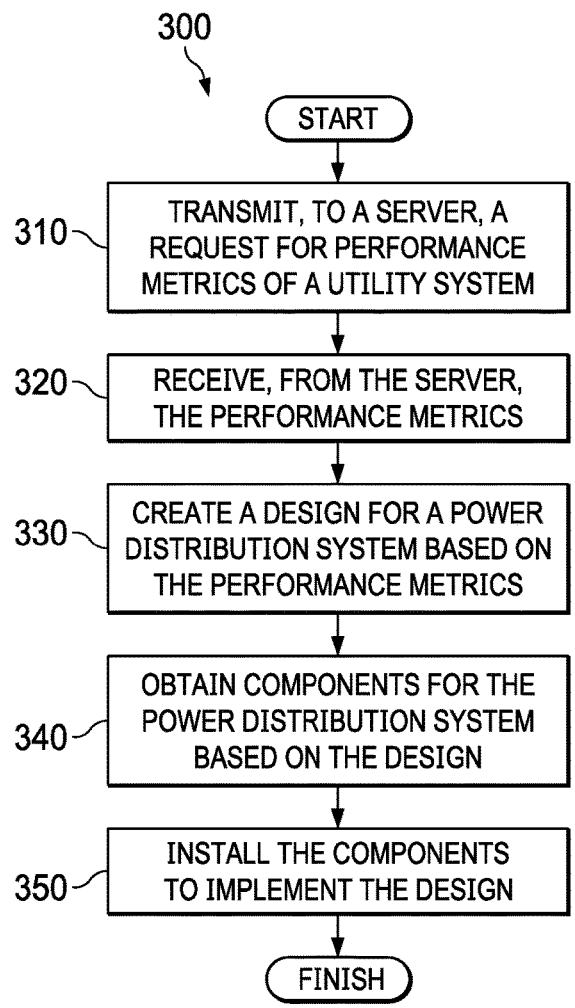
FIG. 3 is a flowchart illustrating a method of installing a power distribution system according to an embodiment of the disclosure.

FIG. 3 is a flowchart illustrating a method 300 of installing a power distribution system according to an embodiment of the disclosure. The electrical system 200 may implement the method 300. At step 310, a request for performance metrics of a utility system is transmitted to a server. For instance, one of the customers 260 transmits to the server 280 a request for performance metrics of the utility system 210. The performance metrics may be short-circuit parameters. At step 320, the performance metrics are received from the server. For instance, the customer 260 receives from the server 280 the performance metrics. At step 330, a design for a power distribution system based on the performance metrics is created. For instance, the customer 260 creates a design for its corresponding power distribution system 250 based on the performance metrics. At step 340, components for the power distribution system are obtained based on the design. For instance, the customer obtains or purchases components of the power distribution system 250 based on the design. Finally, at step 350, the components are installed to implement the design. For instance, the customer 260 installs the components to implement the design.

Figure 4:
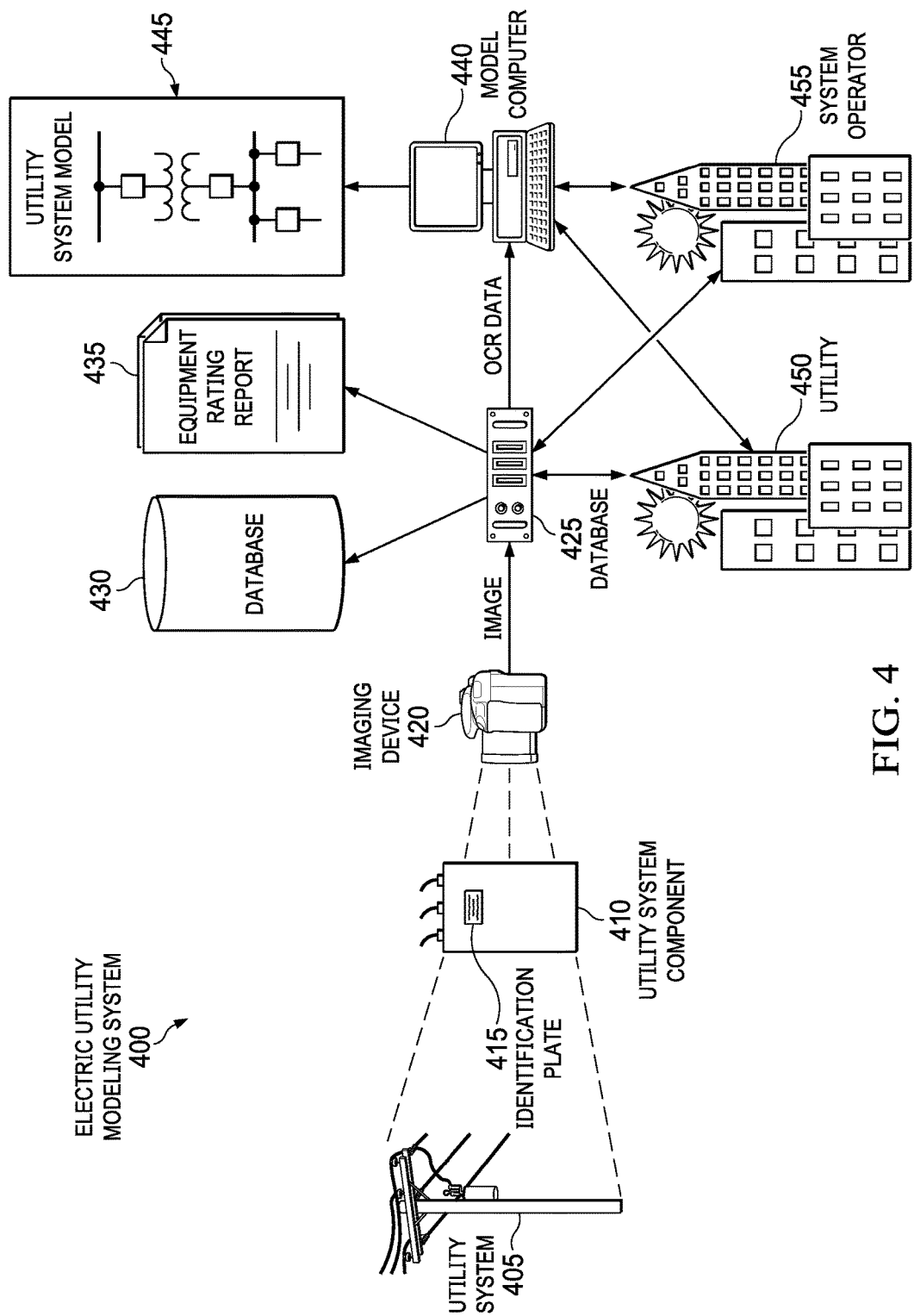
FIG. 4 is a schematic diagram of an electric utility modeling system according to an embodiment of the disclosure.

FIG. 4 is a schematic diagram of an electric utility modeling system 400 according to an embodiment of the disclosure. The system 400 comprises a utility system 405, a utility system component 410, an identification plate 415, an imaging device 420, a database server 425, a database 430, an equipment rating report 435, a model computer 440, a utility system model 445, a utility 450, and a system operator 455. The utility system 405, the model computer 440, the utility system model 445, the utility 450, and the system operator 455 are similar to the utility system 210, the model computer 270, the utility system model 220, the utility 230, and the system operator 240, respectively, in FIG. 2.

The utility system component 410 is any component of the utility system 405. For instance, the utility system component 410 is a transformer. The utility system component 410 comprises an identification plate 415. The identification plate 415 identifies the utility system component 410. The identification plate 415 comprises equipment rating information. For instance, the identification plate 415 comprises a name, a model number, a serial number, and performance data associated with the utility system component 410. The performance data may include equipment voltage ratings, current-carrying capabilities, impedance ratings, insulation resistances, voltage ratios, protective device interrupting capabilities, conductor sizes, and conductor lengths.

The imaging device 420 captures images of the identification plate 415 or a document containing equipment rating information and stores those images in any suitable form. The document is a portable document format (PDF) document or other suitable document. The imaging device 420 may be a camera, a mobile phone, a scanner, an unmanned aerial vehicle (UAV), or a satellite. The imaging device 420 may perform OCR and other functions in that case, instead of storing the images themselves, the imaging device 420 may store OCR data associated with the images. The imaging device 420 comprises network capability so that it communicates data with the database server 425. The network capability may be a Universal Serial Bus (USB) port, a wireless transmitter and receiver, or other suitable capability. The imaging device 420 further comprises software that facilitates the capturing and the communication of the image.

The database server 425 is any suitable computer server. The database server 425 resides in a local area network (LAN) associated with the utility 450 or the system operator 455. Alternatively, the database server 425 resides in an extended network. The database server 425 receives images from the imaging device 420, performs OCR on those images, and stores the OCR data in the database 430. The database server 425 creates the equipment rating report 435, which is a report that identifies the components of the utility system 405 along with the OCR data from the database 430. For instance, the equipment rating report 435 comprises a first array of data identifying the components of the utility system 405, a second array of data comprising the OCR data, and pointers pointing the first array to the second array or vice versa. If neither the imaging device 420 nor the database server 425 performs OCR on the images from the imaging device 420, then the database 430 comprises the images from the imaging device 420 and the model computer 440 performs OCR on the images. The database 430 may be, for instance, a Fluor® Nucleus EPC database.

The utility 450 or the system operator 455 may desire to add a component, for instance the utility system component 410, to the utility system 405. Alternatively, the utility 450 or the system operator 455 may desire to replace an existing component with the utility system component 410. In either case, workers for the utility 450 or the system operator 455 physically install the utility system component 410. A worker uses the imaging device 420 to capture an image of the identification plate 415 or an image of a document containing equipment rating information for the utility system component 410. Upon capturing the image, the imaging device 420 automatically transmits the image to the database server 425 or the worker executes a function on the imaging device 420 that causes the imaging device 420 to transmit the image to the database server 425 via the USB port or the wireless transmitter. Alternatively, the worker transmits to the database server 425 the image of the document containing equipment rating information or the document itself using a computer or other network device.

The database server 425 performs OCR on the image to extract OCR data. The OCR data includes the name, the model number, the serial number, and performance data associated with the utility system component 410. The database server 425 organizes the OCR data into the equipment rating report 435. Upon extracting the OCR data, at set times, upon request from the model computer 440, or based on other triggers, the database server 425 transmits to the model computer 440 either the equipment rating report 435 or the OCR data in an unorganized fashion. The set times may be daily, monthly, yearly, or other suitable times.

The model computer receives the equipment rating report 435 or the OCR data. The model computer 440 updates the utility system model 445 based on the equipment rating report 435 or the OCR data. The model computer 440 may then update a server such as the server 280 with updated short-circuit parameters associated with the updated utility system model 445. At set times, upon request from customers such as the customers 260, or based on other triggers, the server transmits the updated short-circuit parameters to the customers. The set times may be daily, monthly, yearly, or other suitable times. Alternatively, the server logs all customer requests and, upon receiving the updated short-circuit parameters, transmits those updated short-circuit parameters to those customers.

As described above, workers for the utility 450 or the system operator 455 use the imaging device 420 to capture an image of the identification plate 415 or an image of a document containing equipment rating information for the utility system component 410. In a similar way, workers for customers of the utility 450 or the system operator 455 may capture images of identification plates belonging to power distribution system components, input those images to a design computer, and have design computers OCR the images to obtain equipment rating information of the power distribution system components. The design computers may then design power distribution systems based on short-circuit parameters received from the server 280 and the equipment rating information obtained locally. Also in a similar way, workers for the customers may capture images of identification plates belonging to power distribution system components that the customers subsequently add.

An application or a group of applications may implement the various functions described with respect to FIG. 4. For instance, the application resides on the imaging device 420, the database server 425, the model computer 440, and computers associated with the customers. The application may facilitate communication among those components. Thus, the application may automatically perform the steps above so that the only user input occurs when the worker captures the image of the identification plate 415. To do so, the worker may open the application on the imaging device 420 and execute a function indicating that the worker desires to capture the image. The function may be, for instance, a touch screen button. Upon capturing the image, the worker may need to execute another function to confirm that the image is acceptable. That function may also be a touch screen button. The application may then perform the remaining functions.

Figure 5:
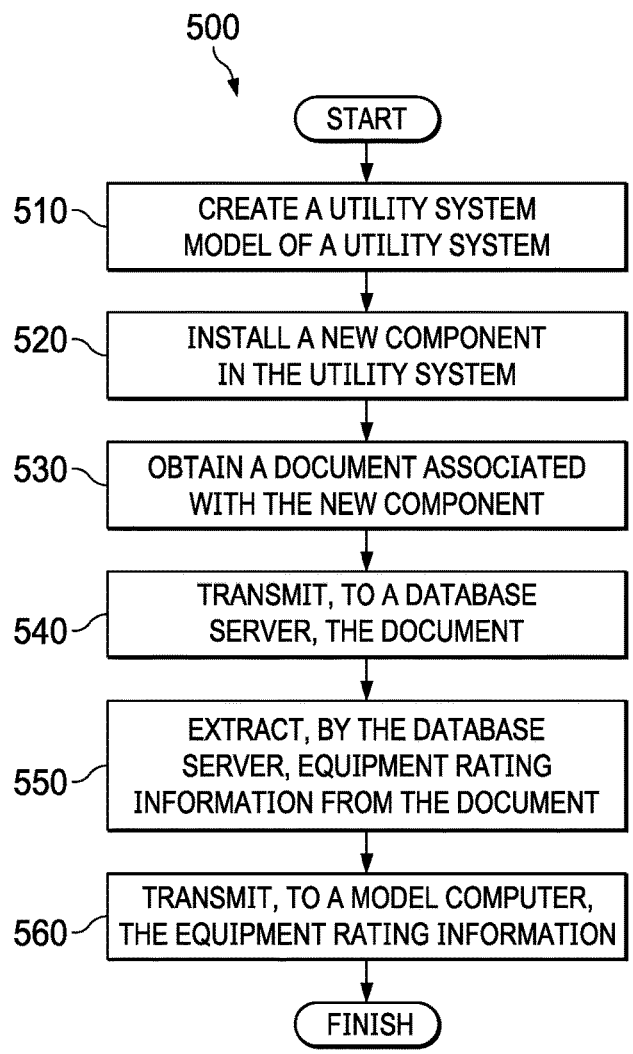
FIG. 5 is a flowchart illustrating a method of extracting equipment rating information according to an embodiment of the disclosure.

FIG. 5 is a flowchart illustrating a method 500 of extracting equipment rating information according to an embodiment of the disclosure. The utility modeling system 400 may implement the method 500. At step 510, a utility system model of a utility system is created. For instance, the utility 450 or the system operator 455 creates the utility system model 445 using the model computer 440. At step 520, a new component is installed in the utility system. For instance, the utility 450 or the system operator 455 installs the utility system component 410 in the utility system 405. At step 530, a document associated with the new component is obtained. For instance, a worker from the utility 450 or the system operator 455 captures an image of the identification plate 415. At step 540, a document is transmitted to a database server. For instance, the imaging device 420 transmits the image to the database server 425. At step 550, the database server extracts equipment rating information from the document. For instance, the database server 425 performs OCR on the image to extract equipment rating information. Finally, at step 560, the equipment rating information is transmitted to a model computer. For instance, the database server 425 transmits the equipment rating information to the model computer 440.

FIG. 2 illustrates an electrical system 200, and FIG. 4 separately illustrates a utility modeling system 400. However, FIGS. 2 and 4 may be combined in a single system. Thus, the server 280, the power distribution systems 250, and the customers 260 may be part of the utility modeling system 400. Similarly, the utility system component 410, the imaging device 420, the database server 425, and their corresponding components may be part of the electrical system 200. In addition, FIGS. 2 and 4 are simplified so that other components may be present to, for instance, provide connectivity between two components.

Figure 6:
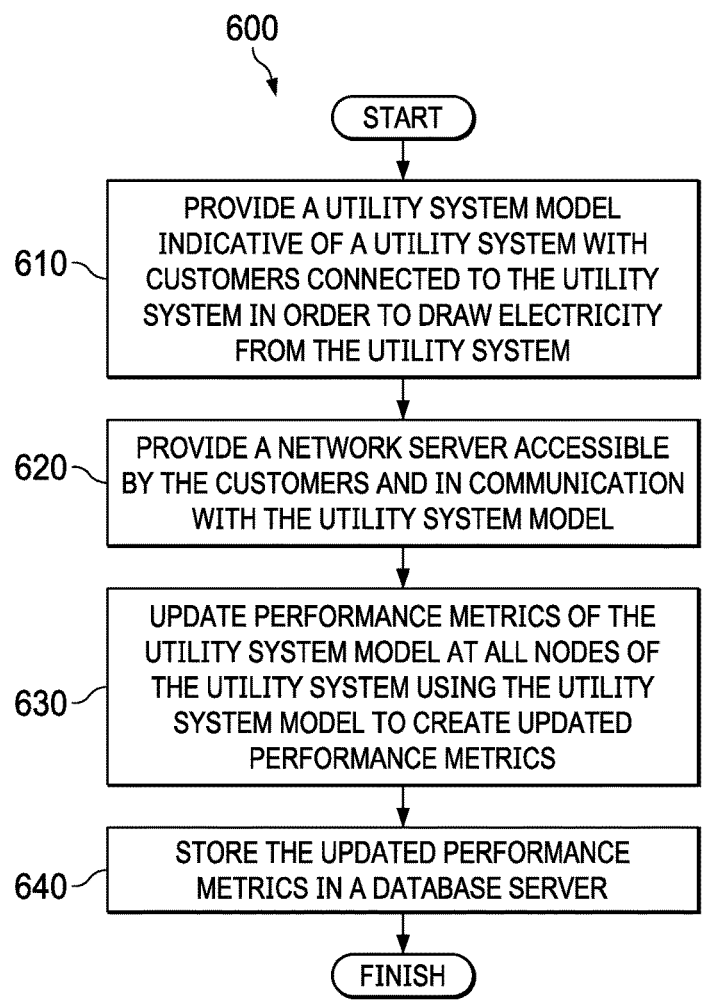
FIG. 6 is a flowchart illustrating a method of updating performance metrics of a utility system according to an embodiment of the disclosure.

FIG. 6 is a flowchart illustrating a method 600 of updating performance metrics of a utility system according to an embodiment of the disclosure. The electrical system 200 and the utility modeling system 400 may implement the method 600. At step 610, a utility system model indicative of a utility system with customers connected to the utility system in order to draw electricity from the utility system is provided. For instance, the utility 230 or the system operator 240 provides the utility system model 220. The utility system model 220 is indicative of the utility system 210 with the customers 260 connected to the utility system 210 in order to draw electricity from the utility system 210. At step 620, a network server accessible by the customers and in communication with the utility system model is provided. For instance, the utility 230 or the system operator 240 provides the server 280. The server 280 is accessible by the customers 260 and is in communication with the utility system model 220. At step 630, performance metrics of the utility system model at all nodes of the utility system are updated using the utility system model to create updated performance metrics. For instance, the utility 230 or the system operator 240 updates performance metrics of the utility system model 220 at all nodes of the utility system 210 using the utility system model 220 to create updated performance metrics. Those nodes represent each point where the customers 260 and their corresponding power distribution systems 250 are connected to the utility system 210. Finally, at step 640, the updated performance metrics are stored in a database server. For instance, the utility 230 or the system operator 240 stores the updated performance metrics in the database server 280.

Figure 7:
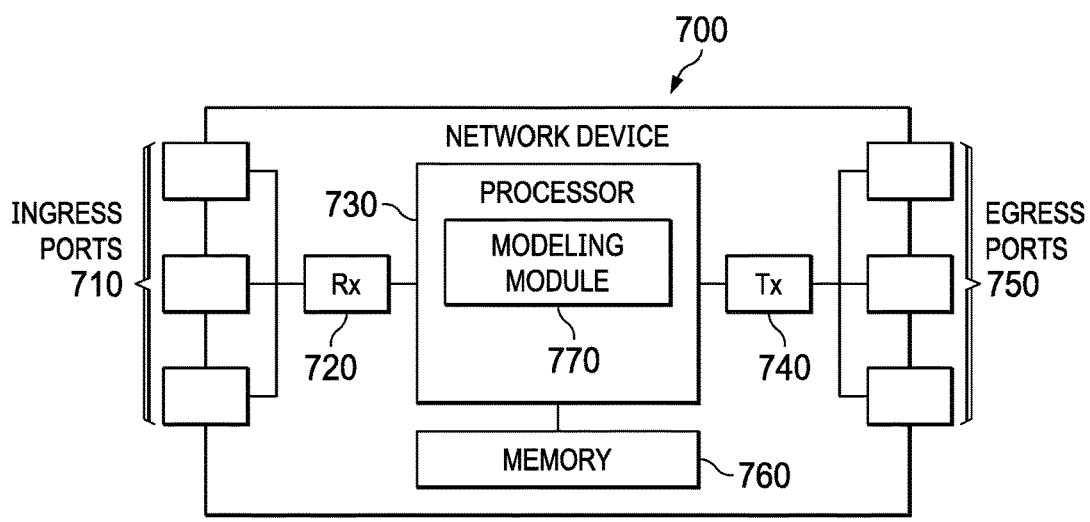
FIG. 7 is a schematic diagram of a network device according to an embodiment of the disclosure.

FIG. 7 is a schematic diagram of a network device 700 according to an embodiment of the disclosure. The network device 700 is suitable for implementing the disclosed embodiments. The network device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network device 700 may also comprise optical-to-electrical (OF) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a modeling module 770.

The modeling module 770 assists in implementing the disclosed embodiments. For instance, the modeling module 770 implements the functions of the model computer 270, the server 280, the imaging device 420, and the database server 425 described above. The modeling module 770 therefore provides a substantial improvement to the functionality of the network device 700 and effects a transformation of the network device 700 to a different state. Alternatively, modeling module 770 is implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (RUM), random-access memory (RAM), ternary content-addressable memory (TCAM), and static random-access memory (SRAM).

Having described numerous devices, systems, and method herein, various embodiments can include, but are not limited to:

In a first embodiment, a method comprises: transmitting, to a server, a request for performance metrics of a utility system; receiving, from the server, the performance metrics; creating a design for a power distribution system based on the performance metrics; obtaining components for the power distribution system based on the design; and installing the components to implement the design.

A second embodiment can include the method of the first embodiment, further comprising: determining content based on the performance metrics; obtaining labels with the content; and applying the labels to the components.

A third embodiment can include the method of any of the first embodiment to the second embodiment, wherein the content is arc flash hazard (AFH) values and the labels are AFH labels.

A fourth embodiment can include the method of any of the first embodiment to the third embodiment, further comprising: transmitting, to the server, a request for updated performance metrics of the utility system; receiving, from the server, the updated performance metrics; creating an updated design for the power distribution system based on the updated performance metrics; obtaining a new component based on the updated design; and installing the new component to implement the updated design.

A fifth embodiment can include the method of any of the first embodiment to the fourth embodiment, wherein the performance metrics do not account for a new utility system component, and wherein the updated performance metrics do account for the new utility system component.

A sixth embodiment can include the method of any of the first embodiment to the fifth embodiment, wherein the performance metrics are short-circuit parameters for a node associated with the power distribution system.

A seventh embodiment can include the method of any of the first embodiment to the sixth embodiment, wherein the short-circuit parameters comprise: a minimum short-circuit current; a maximum short-circuit current; a reactance-to-resistance (X/R) ratio; a minimum system voltage; a maximum system voltage; and a fault clearing time.

In an eighth embodiment, a method comprises: creating a utility system model of a utility system; installing a new component in the utility system; obtaining a document associated with the new component; transmitting, to a database server, the document; extracting, by the database server, equipment rating information from the document; and transmitting, to a model computer, the equipment rating information.

A ninth embodiment can include the method of the eighth embodiment, further comprising creating, on the model computer, an updated utility system model of the utility system based on the equipment rating information.

A tenth embodiment can include the method of any of the eighth embodiment to the ninth embodiment, further comprising determining, via the model computer, updated short-circuit parameters from the updated utility system model.

An eleventh embodiment can include the method of any of the eighth embodiment to the tenth embodiment, further comprising transmitting, to a server, the updated short-circuit parameters.

A twelfth embodiment can include the method of any of the eighth embodiment to the eleventh embodiment, further comprising: logging, by the server, requests from customers for previous short-circuit parameters; receiving, by the server, the updated short-circuit parameters; and transmitting, by the server and to the customers, the updated short-circuit parameters based on the receiving.

A thirteenth embodiment can include the method of any of the eighth embodiment to the twelfth embodiment, further comprising: logging, by the server, requests from customers for previous short-circuit parameters; receiving, by the server, the updated short-circuit parameters; and transmitting, by the server and to the customers, the updated short-circuit parameters based on set times.

A fourteenth embodiment can include the method of any of the eighth embodiment to the thirteenth embodiment, further comprising: receiving, by the server, the updated short-circuit parameters; and transmitting, by the server and to a customer, the updated short-circuit parameters based on a request from the customer.

A fifteenth embodiment can include the method of any of the eighth embodiment to the fourteenth embodiment, wherein the obtaining comprises capturing, using an imaging device, an image of an identification plate of the new component.

A sixteenth embodiment can include the method of any of the eighth embodiment to the fifteenth embodiment, wherein the extracting comprises performing optical character recognition on the image.

In a seventeenth embodiment, a system comprises: a database server configured to: receive documents associated with components of a utility system, extract equipment rating information from the documents, and store the equipment rating information in a usable form in a database; and a model computer coupled to the database server and configured to: receive the equipment rating information from the database server, create a utility system model based on the equipment rating information, and determine short-circuit parameters for nodes associated with customers.

An eighteenth embodiment can include the system of the seventeenth embodiment, further comprising a network server coupled to the model computer and configured to: receive the short-circuit parameters from the model computer; and transmit the short-circuit parameters to the customers upon their requests.

A nineteenth embodiment can include the system of any of the seventeenth embodiment to the eighteenth embodiment, wherein the network server is further configured to provide a webpage for the customers to access, wherein the webpage is configured to provide an interface to receive and log the requests.

A twentieth embodiment can include the system of any of the seventeenth embodiment to the nineteenth embodiment, further comprising an imaging device configured to: capture images of identification plates of the components, wherein the images are the documents; and transmit the images to the database server.

In a twenty-first embodiment, a method comprises: providing a utility system model indicative of a utility system with customers connected to the utility system in order to draw electricity from the utility system; providing a network server accessible by the customers and in communication with the utility system model; updating performance metrics of the utility system model at all nodes of the utility system using the utility system model to create updated performance metrics; and storing the updated performance metrics in a database server.

A twenty-second embodiment can include the method of the twenty-first embodiment, wherein the updating is based on set times, customer requests, or receipt of equipment rating information.

A twenty-third embodiment can include the method of any of the twenty-first embodiment to the twenty-second embodiment, further comprising: receiving a document indicative of an addition of a component to the utility system; performing optical character recognition (OCR) on the document to obtain equipment rating information of the component; and transmitting the equipment rating information to a model computer.

A twenty-fourth embodiment can include the method of any of the twenty-first embodiment to the twenty-third embodiment, further comprising: receiving a request for the updated performance metrics; and transmitting the updated performance metrics in response to the receiving.

A twenty-fifth embodiment can include the method of any of the twenty-first embodiment to the twenty-fourth embodiment, further comprising: installing a new component in the utility system; capturing an image of the new component; and transmitting the image to a database server.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. A method comprising:
  providing a utility system model indicative of a utility system with customers connected to the utility system in order to draw electricity from the utility system, wherein the utility system comprises physical compo- nents configured to generate, transmit, and distribute electricity to power distribution systems of the customers, and wherein the utility system model is a computerized model of the utility system;

providing a network server accessible by the customers and in communication with the utility system model;

updating performance metrics of the utility system model at all nodes of the utility system using the utility system model to create updated performance metrics;

storing the updated performance metrics in a database server;

receiving a document indicative of an addition of a physical component to the utility system;

performing optical character recognition (OCR) on the document to obtain equipment rating information of the physical component;

transmitting the equipment rating information to a model computer; and installing a new physical component in the utility system.

2. The method of claim 1, wherein the updating is based on set times, customer requests, or receipt of equipment rating information.

3. The method of claim 1, further comprising:
receiving a request for the updated performance metrics; and
transmitting the updated performance metrics in response to the receiving.

4. The method of claim 1, further comprising:
capturing an image of the new physical component; and
transmitting the image to a database server.

5. The method of claim 1, wherein the physical components comprise generating stations, transmission lines, and transformers.

6. The method of claim 1, wherein updating the performance metrics of the utility system model comprise updating the performance metrics of the physical components modeled in the utility system model.

7. The method of claim 1, wherein each node of the nodes of the utility system is a point at which a power distribution system of a customer is connected to the utility system.

8. The method of claim 7, wherein the performance metrics comprise short circuit parameters.

9. The method of claim 1, further comprising:
creating the utility system model of the utility system;
installing a new physical component in the utility system;
obtaining a document associated with the new physical component;
transmitting, to a database server, the document;
extracting, by the database server, equipment rating information from the document; and
transmitting, to a model computer, the equipment rating information.

10. The method of claim 9, further comprising creating, on the model computer, an updated utility system model of the utility system based on the equipment rating information.

11. The method of claim 10, further comprising: determining, via the model computer, updated short-circuit parameters from the updated utility system model.

12. The method of claim 11, further comprising transmitting, to the network server, the updated short-circuit parameters.

13. The method of claim 12, further comprising:
logging, by the network server, requests from customers for previous short-circuit parameters;
receiving, by the network server, the updated short-circuit parameters; and
transmitting, by the network server and to the customers, the updated short-circuit parameters based on the receiving.

14. The method of claim 12, further comprising:
logging, by the network server, requests from customers for previous short-circuit parameters;
receiving, by the network server, the updated short-circuit parameters; and
transmitting, by the network server and to the customers, the updated short-circuit parameters based on set times.

15. The method of claim 12, further comprising:
receiving, by the network server, the updated short-circuit parameters; and
transmitting, by the network server and to a customer, the updated short-circuit parameters based on a request from the customer.

16. The method of claim 9, wherein the obtaining comprises capturing, using an imaging device, an image of an identification plate of the new physical component.

17. The method of claim 16, wherein the extracting comprises performing optical character recognition on the image.

18. The method of claim 1, further comprising:
transmitting, to the network server, a request for the performance metrics of the utility system;
receiving, from the network server, the performance metrics;
creating a design for a power distribution system based on the performance metrics, wherein the utility system is the power distribution system;
obtaining physical components for the power distribution system based on the design; and
installing the physical components in the power distribution system to implement the design.

19. The method of claim 18, further comprising:
determining content based on the performance metrics;
obtaining labels with the content; and
applying the labels to the physical components.

20. The method of claim 19, wherein the content is arc flash hazard (AFH) values and the labels are AFH labels.

21. The method of claim 18, further comprising:
transmitting, to the network server, a request for the updated performance metrics of the utility system;
receiving, from the network server, the updated performance metrics;
creating an updated design for the power distribution system based on the updated performance metrics;
obtaining a new physical component based on the updated design; and
installing the new physical component to implement the updated design.

22. The method of claim 21, wherein the performance metrics do not account for a new utility system component, and wherein the updated performance metrics do account for the new utility system component.

23. The method of claim 18, wherein the performance metrics are short-circuit parameters for a node associated with the power distribution system.

24. The method of claim 23, wherein the short-circuit parameters comprise:
a minimum short-circuit current;
a maximum short-circuit current;
a reactance-to-resistance (X/R) ratio;
a minimum system voltage;
a maximum system voltage; and
a fault clearing time.

* * * * *